(12) United States Patent
Sommerer

(10) Patent No.: US 6,966,026 B1
(45) Date of Patent: Nov. 15, 2005

(54) BALANCED VIEW GENERATION FOR ELECTRONIC DOCUMENTS

(75) Inventor: Ralph Sommerer, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/410,644

(22) Filed: Oct. 1, 1999

(51) Int. Cl.[7] .............................................. G06F 17/00
(52) U.S. Cl. ...................... 715/500; 715/531
(58) Field of Search .............. 707/518, 519, 707/530, 531, 500

(56) References Cited

U.S. PATENT DOCUMENTS 3,654,611 A * 4/1972 Bluethman et al. ......... 707/517
4,608,664 A * 8/1986 Bartlett et al. ............... 358/1.2
4,891,771 A * 1/1990 Edel et al. .................... 707/521
5,043,936 A * 8/1991 Majima ....................... 707/519
5,425,138 A * 6/1995 Kumakawa ................. 707/510
6,223,191 B1 * 4/2001 Truelson ..................... 707/517

* cited by examiner

Primary Examiner—Sanjiv Shah
(74) Attorney, Agent, or Firm—Amin & Turocy, LLP

(57) ABSTRACT

Balanced view generation of pages of electronic documents is disclosed. In one embodiment, balancing the text of a page without forcing any of the text onto previous or subsequent pages is accomplished on a rolling pair of lines-by-rolling pair of lines basis. For each of a series of rolling pairs of lines of the page (for example, lines of text), it is determined whether a first line of the rolling pair is less than a second line of the rolling pair in length. If so, then it is determined whether a last word of the first line would fit as a first word of the second line, and whether so doing would meet a predetermined criteria. If so, then this action is performed.

11 Claims, 3 Drawing Sheets

BALANCED VIEW GENERATION FOR ELECTRONIC DOCUMENTS

RELATED APPLICATIONS

This application is related to the coassigned, cofiled and copending application entitled "Dynamic Pagination for Electronic Documents" Ser. No. 09/410,414.

FIELD OF THE INVENTION

This invention relates generally to electronic documents such as electronic books, and more particularly balanced view generation of a page of such electronic documents.

BACKGROUND OF THE INVENTION

Documents, such as books, magazines, etc., are increasingly being distributed in an electronic manner. For example, books distributed electronically are commonly referred to as electronic books. The terminology electronic document is used herein to refer to any type of document that is stored and/or distributed in an electronic manner. Such so-called electronic documents can be viewed on general-purpose desktop and laptop computers as well as other devices, such as personal digital assistants (PDA's), palmtop computers, hand-held computers, set-top boxes for television sets, etc. Furthermore one type of device on which electronic documents can be viewed is referred to as an electronic book device, which is a specialized device designed for the reading of electronic documents.

For such electronic documents to be viewable they typically we initially paginated, where each page of the document may, for example, correspond to what is viewable on the screen of a target device. The documents may be statically paginated specifically for a particular device, or dynamically paginated, so that the documents are not specific to a particular device. An example of the latter is described in the cofiled, coassigned and copending patent application entitled "Dynamic Pagination for Electronic Documents" Ser. No. 09/410,414.

A disadvantage associated with pagination of electronic documents is that while the process of paginating does divide a document into its constituent pages, each of these pages may not be visually optimal for viewing purposes. For example dynamic pagination as described in the patent application referenced in the preceding paragraph is a greedy, one-pass process. That is, it is first determined the maximum number of words that can fit in one "slot" of the page, and then it is determined the maximum number of words that can fit in the next slot, et seq. The process is greedy in that the maximum number of words that can fit in one slot is always fit into this slot—there is no determination if, for example, the last word in a first slot would look better if it were in the next slot. This also means that the process is a one-pass process, in that once a slot has been fit within a maximum number of words, the process does not go back to that slot again in the context of dynamic pagination.

This can result in the layout of words within consecutive slots that is less than visually appealing, however. For example, in the page 500 of FIG. 1, two specific slots are shown, slot 502 and slot 504. The slot 502 has words 506, 508 and 510 inserted therein, while the slot 504 has the word 512 inserted therein, as a result of a greedy, one-pass dynamic pagination process. That is, the process determined that word 510 (a small word) could fit in the same slot as the words 506 and 508, so it inserted the word 510 into the slot 502. However, when the process proceeded to slot 504, it determined that only the word 512 could fit therein, perhaps because the next word (not shown in FIG. 1) was a long word. This results in a visually unappealing group of consecutive lines (where in the context of page balancing a line refers to the text within a given slot), in that the line including words 506, 508 and 510 is much longer than the line including just word 512.

Changing the layout of words on a page, however, can result in the pagination of the document of which the page is a part to be skewered as well. For example, a last word or words from one page may be forced onto the next page, or a first word or words from one page may be forced onto the previous page. By skewering the pagination of the document, however, any indexing or other processes that may have already been performed with respect to the document and its previous pagination must be reperformed. This is disadvantageous, and may result in a page being displayed as it is originally paginated, without any adjustment for visual optimality purposes. For these and other reasons, therefore, there is a need for the present invention.

SUMMARY OF THE INVENTION

The invention relates to balanced view generation for electronic documents. In one embodiment, a computer-implemented method balances at least the text of a page without forcing any of the text onto a previous or a next page. The page, as balanced, is then output. In one embodiment, balancing the text of a page without forcing any of the text onto previous or subsequent pages is accomplished on a rolling pair of lines-by-rolling pair of lines basis. For example, balancing can be accomplished by moving a word from a first line of a rolling pair of lines to the second line of the rolling pair, based on some predetermined criteria.

More specifically, in one embodiment, balancing is accomplished by, for each of a series of rolling pairs of lines of the page (for example, lines of text), determining whether a first line of the rolling pair is longer than a second line of the rolling pair. If so, then it is determined whether a last word of the first line would fit as a first word of the second line, and whether so doing would meet a predetermined criteria. If the criteria is met, then this action is performed.

Embodiments of the invention provide for advantages not found in the prior art. Pages of electronic documents can be rebalanced prior to being displayed, without affecting their pagination. This is because the balancing techniques of embodiments of the invention do not force words from one page to a prior or subsequent page. Thus, balancing can be performed independent of pagination, at a time when display of a given page is to be accomplished.

The invention includes electronic devices, computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

Introduction

Figure 1:
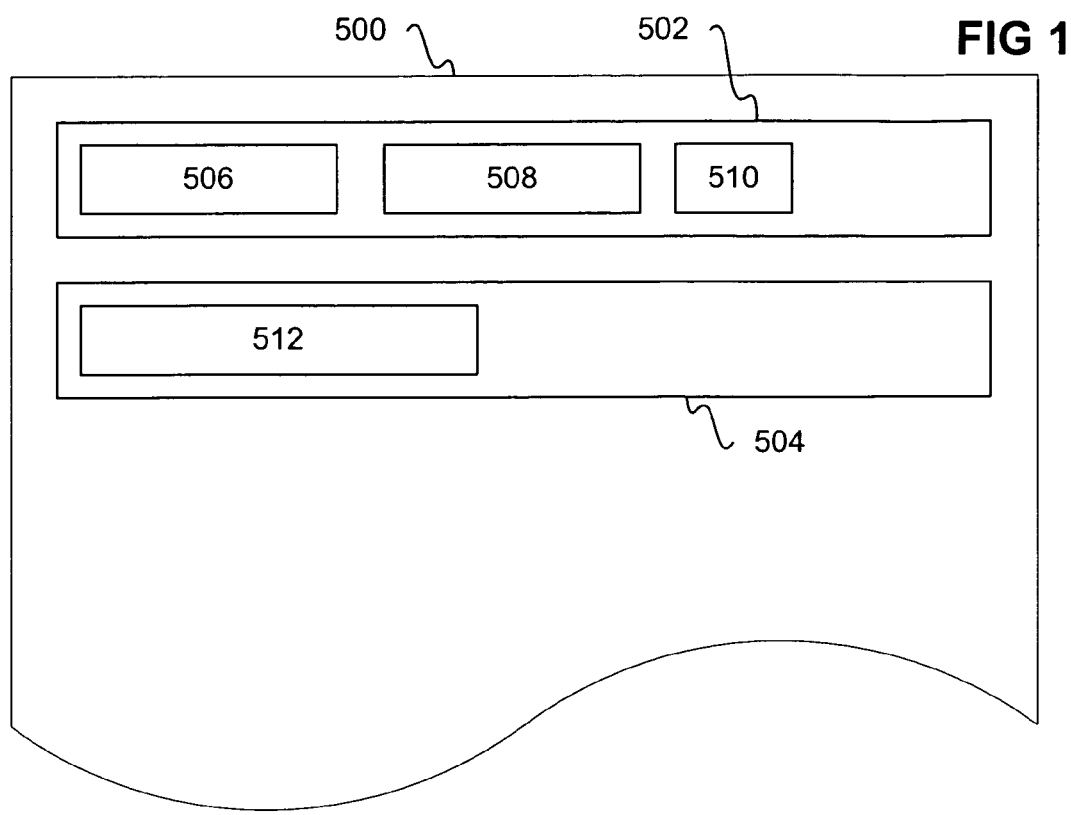
FIG. 1 is a diagram of an unbalanced text layout of a page of an electronic document, that may be correctable by an embodiment of the invention.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Overview

In this section, an overview of embodiments of the invention is provided. The overview is meant to provide a general description of at least some embodiments of the invention. In subsequent sections, more detailed embodiments of the invention are presented. Page balancing according to embodiments of the invention is with respect to a page of an electronic document, which is an electronic version of a document that may or may not also be available as a hard copy (e.g., paper) version. For example, such documents include books, magazines, pamphlets, web pages, etc. The invention is not particularly limited to a given type of electronic document. The document includes at least text, and may also include other aspects, such as images, footnotes, etc., as well.

Figure 2:
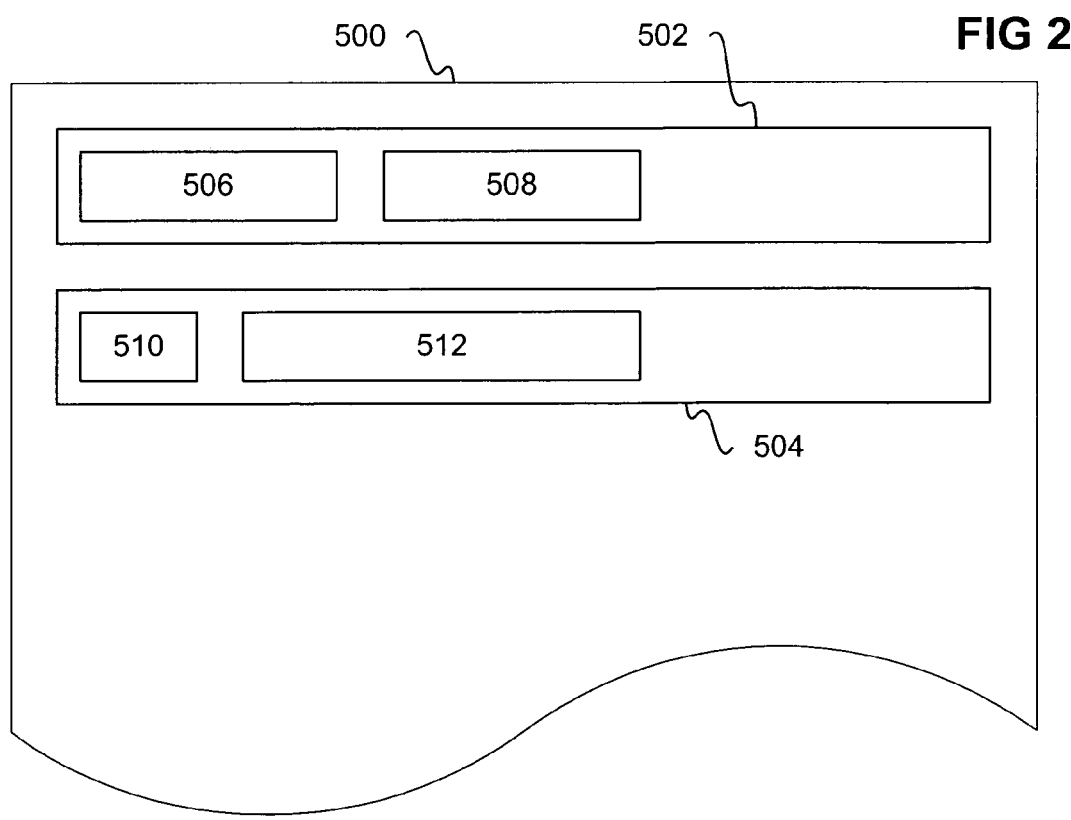
FIG. 2 is a diagram of the page layout of FIG. 1, after it the page has been balance in accordance with an embodiment of the invention.

Balancing a page in one embodiment means examining at rolling pairs of lines (i.e., first lines one and two, then lines two and three, et seq.) to determine if there should be any balancing between a consecutive pair of rolling lines. For example, balancing the page 500 of FIG. 1, referenced in the background section, according to one embodiment of the invention, results in the page 500 being modified as shown in FIG. 2. As specifically shown in FIG. 2, balancing results in the movement of the word 510 from being the last word in the slot 502 to the first word in the slot 504. This results in two lines, a first line having words 506 and 508, and a second line having words 510 and 512, such that the length of each of the two lines is more evenly matched—and resulting in a more visually appealing pair of lines.

Importantly, words are not moved from one page to the next in accordance with balancing of pages pursuant to embodiments of the invention, so that the page breaks determined by any previous pagination process do not become inaccurate.

Once a page has been balanced, some embodiments of the invention output the page. The invention is not limited to the manner by which output is accomplished. For example, in one embodiment, output can be to a further program or software component. As another example, output can be displayed on a display device, or printed to a printer, etc. (For example, the page can be displayed.) As a third example, output can result in the storage of the page as data in memory or on a storage device for subsequent display, for example.

Furthermore, it is noted that some embodiments of the invention relate to methods, such as computer-implemented methods. Such computer-implemented methods are desirably realized at least in part as one or more programs running on a computer—that is, as a program made up of instructions and executed from a computer-readable medium such as a memory by a processor of a computer. The programs are desirably storable on a machine-readable medium such as a floppy disk or a CD-ROM, for distribution and installation and execution on another computer.

Specific Embodiment for Page Balancing

In this section of the detailed description, a specific embodiment of the invention for performing the page balancing (i.e., balanced view generation) described in the preceding section of the detailed description is presented. It is noted that the invention is not limited to this specific embodiment, however. As described herein, the specific embodiment pertains to electronic documents that are electronic books. However, embodiments of the invention are not so limited to documents that are books, as can be appreciated by those of ordinary skill within the art.

Figure 3:
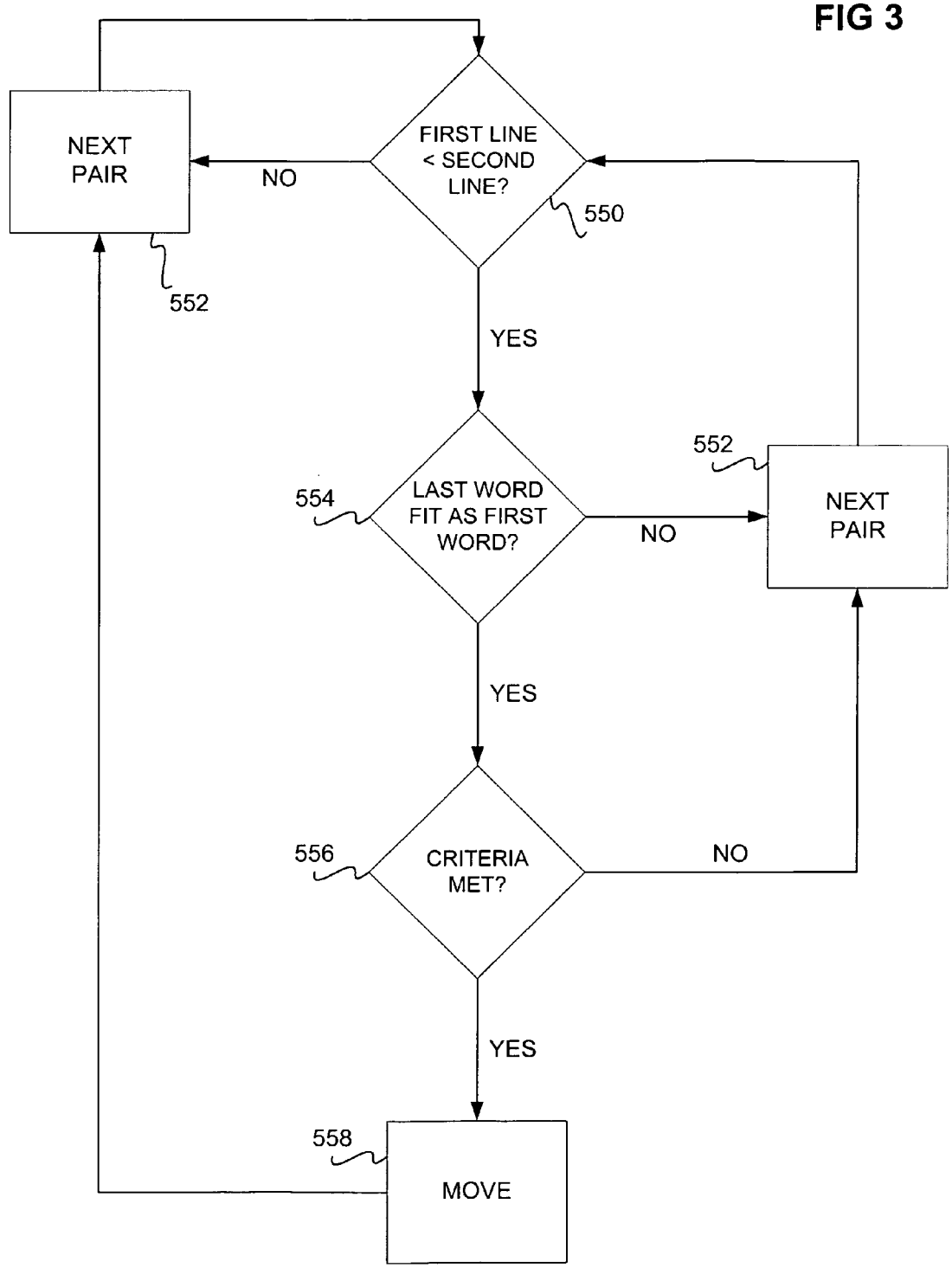
FIG. 3 is a flowchart of a method for page balancing, according to an embodiment of the invention; and, FIG. 4 is a diagram of a representative electronic device, according to an embodiment of the invention.

Referring to FIG. 3, a method for balancing a desired page is shown. The method assumes starting with a first rolling pair of lines of the page—for example, lines one and two of the page. In 550, it is determined whether the length of the first line is less than the length of the second line. Length (as well as width) of the lines and their corresponding slots can be measured in pixels, as well as other denominations. If the length of the first line is less than the length of the second line, then the method proceeds to 552, where the next rolling pair of lines is advanced to—for example, lines two and three of the page after lines one and two—and the method starts again at 550.

If the length of the first line is equal to or greater than the length of the second line, then the method instead proceeds from 550 to 554, where it is determined whether the last word of the first line could fit as the first word of the second line. That is, it is determined whether moving the last word of the first line down to the second line, as the first word of the second line, would result in a length of the second line less than the maximum allowed length of the slot of this line. If not, then the method again proceeds to 552.

However, if movement of the last word of the first line to the first word of the second line can be accomplished, then in 556 it is determined whether this is desirable, in accordance with a predetermined criteria. For example, this predetermined criteria can be such that word movement is made only if the visual aesthetics of the two lines are improved. However, the invention is not so limited. If the criteria is not met, then the word is not moved, and the method proceeds once more to 552.

In one specific example, this predetermined criterion is based on the space between words as observed on a justified line (lines are justified by distributing the "unused" width of a line evenly among all word gaps). The criterion is met if both of the following conditions are true:

The sum of the word gaps of both rolling lines (word gap on first line plus word gap on second line) is getting smaller by moving the word to the second line (the line lengths assimilate).

The difference of the word gaps of both lines (word gap on first line minus word gap on second line, absolute value taken) is getting smaller by moving the word to the second line (the word gaps assimilate).

However, if the criteria is met, then the last word of the first line is moved to become the first word of the second line of the rolling pair, in 558, resulting in a visually more pleasing pair of rolling lines. The method then proceeds to 552, to advance to the next pair of rolling lines. It is noted that in 552, whenever 552 is performed, if there are no more pairs of rolling lines to advance to, then the method of FIG. 3 ends at 552. Furthermore, it is noted that page balancing is not required to be performed in accordance with the specific embodiment of FIG. 3, as those of ordinary skill within the art can appreciate.

Representative Device for Viewing Electronic Documents

As described, the methods of the previous sections of the detailed description can be implemented on any type of computerized device, such as a general-purpose laptop or desktop computer, a personal digital assistant (PDA), a palm-top computer, a hand-held computer, a specialized electronic book device, etc. However, one such representative device is described in this section of the detailed description. Those of ordinary skill within the art can appreciate that the invention is not limited to this representative device for viewing electronic documents.

Figure 4:
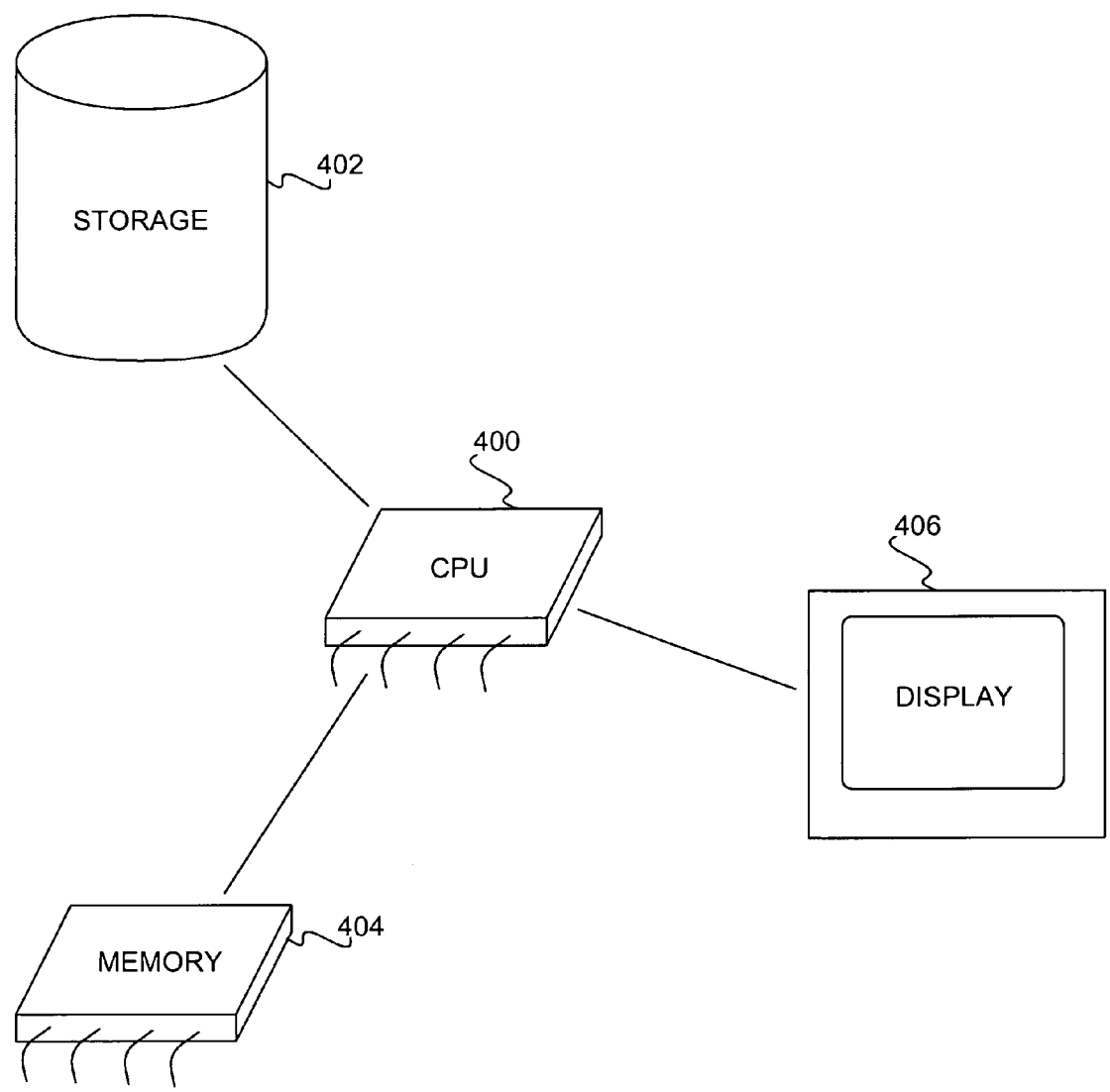

Referring to FIG. 4, a diagram of such a representative device, in accordance with an embodiment of the invention, is shown. The electronic device includes a processor, or central-processing unit (CPU), 400, a storage device 402, a memory device 404, and a display device 406. The processor 400 is the processor that executes computer programs to perform methods such as those described in the preceding sections of the detailed description. The storage device 402 is a non-volatile storage device, such as a hard disk drive, flash memory device, PC card hard drive, etc., on which an electronic document is stored. The memory device 404 is a volatile device, such as a dynamic random-access memory (DRAM), a synchronous dynamic-random access memory (SDRAM), etc., into which a page of the document, including at least text, can be stored temporarily. The display device 406 can be a flat-panel display, such as a liquid-crystal display (LCD), a plasma display, etc., or a cathode-ray tube (CRT), such as commonly found with desktop computers as monitors. The device 406 displays a rendered, or laid-out, page, after balancing.

Thus, the processor 400 executes a computer program to balance the text on the page without forcing any of the text onto a previous page or a next page. The program can accomplish such balancing on a rolling pair of lines-by-rolling pair of lines basis, by moving, for example, a word from a first line of the rolling pair of lines to the second line of the rolling pair of lines, based on a predetermined criteria, as has been described in the previous section of the detailed description. More specifically, the program can accomplish such balancing according to the specific embodiment of the invention described in the previous section of the detailed description. The processor 400 can also execute a second computer program to display that page on the display device 406. Each of these programs may be separate, or part of a larger computer program, in which latter case the individual programs are typically referred to as software objects, or software components, as known in the art.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, in some embodiments of the invention, the embodiments described herein can be utilized in conjunction with the subject matter described in the related applications, which have been described at the beginning of this application, and which have been incorporated by reference. The invention is not so limited, however. Therefore, it is manifestly intended that this invention be limited only by the following claims and equivalents thereof.

I claim:

1. A computer-implemented method operable on a page of at least text comprising:

balancing the at least text on the page without forcing any of the at least text onto a previous page or a next page, wherein balancing the page comprises balancing the page on a rolling pair of lines-by-rolling pair of lines basis;

wherein balancing the page on a rolling pair of lines-by-rolling pair of lines basis comprises, for each of a series of rolling pairs of lines of the page, determining whether a first line of the rolling pair is greater than a second line of the rolling pair in length;

upon determining that the first line of the rolling pair is greater than a second line of the rolling pair in length, determining whether a last word of the first line would fit as a first word of the second line;

upon determining that the last word of the first line would fit as a first word of the second line, determining whether moving the last word of the first line as the first word of the second line meets a predetermined criteria;

upon determining that moving the last word of the first line as the first word of the second line meets the predetermined criteria, moving the last word of the first line as the first word of second line; and outputting the page.

2. The method of claim 1, wherein outputting the page comprises displaying the page.

3. The method of claim 1, wherein outputting the page comprises storing the page for later display.

4. The method of claim 1, wherein balancing the page on a rolling pair of lines-by-rolling pair of lines basis comprises moving a word from a first line of a rolling pair of lines to a second line of the rolling pair of lines based on a predetermined criteria.

5. A computer-implemented method operable on a page of at least text comprising:

balancing the at least text on the page without forcing any of the at least text onto a previous page or a next page on a rolling pair of lines-by-rolling pair of lines basis, including for at least one rolling pair of lines, moving a word from first line of the rolling pair of lines to a second line of the rolling pair of lines based on a predetermined criteria;

wherein balancing the page on a rolling pair of lines-by-rolling pair of lines basis comprises, for each of a series of rolling pairs of lines of the page, determining whether a first line of the rolling pair is greater than a second line of the rolling pair in length;

upon determining that the first line of the rolling pair is greater than a second line of the rolling pair in length, determining whether a last word of the first line would fit as a first word of the second line;

upon determining that the last word of the first line would fit as a first word of the second line, determining whether moving the last word of the first line as the first word of the second line meets a predetermined criteria;

upon determining that moving the last word of the first line as the first word of the second line meets the predetermined criteria, moving the last word of the first line as the first word of second line; and outputting the page.

6. A computer-implemented method for balancing a page of at least text comprising, for each of a series of rolling pairs of lines of the page, determining whether a first line of the rolling pair is greater than a second line of the rolling pair in length;

upon determining that the first line of the rolling pair is greater than the second line of the rolling pair in length, determining whether a last word of the first line would fit as a first word of the second line;

upon determining that the last word of the first line would fit as the first word of the second line, determining whether moving the last word of the first line as the first word of the second line meets a predetermined criteria;

upon determining that moving the last word of the first line as the first word of the second line meets the predetermined criteria, moving the last word of the first line as the first word of the second line.

7. A machine-readable medium having a plurality of instructions stored thereon for execution by a processor to perform a method comprising:

balancing the at least text on the page without forcing any of the at least text onto a previous page or a next page on a rolling pair of lines-by-rolling pair of lines basis, including for at least one rolling pair of lines, moving a word from first line of the rolling pair of lines to a second line of the rolling pair of lines based on a predetermined criteria;

wherein balancing the page on a rolling pair of lines-by-rolling pair of lines basis comprises, for each of a series of rolling pairs of lines of the page, determining whether a first line of the rolling pair is greater than a second line of the rolling pair in length;

upon determining that the first line of the rolling pair is greater than a second line of the rolling pair in length, determining whether a last word of the first line would fit as a first word of the second line;

upon determining that the last word of the first line would fit as a first word of the second line, determining whether moving the last word of the first line as the first word of the second line meets a predetermined criteria;

upon determining that moving the last word of the first line as the first word of the second line meets the predetermined criteria, moving the last word of the first line as the first word of second line; and outputting the page.

8. The medium of claim 7, wherein balancing the page on a rolling pair of lines-by-rolling pair of lines basis comprises moving a word from a first line of a rolling pair of lines to a second line of the rolling pair of lines based on a predetermined criteria.

9. A machine-readable medium having a plurality of instructions stored thereon for execution by a processor to perform a method comprising, for each of a series of rolling pairs of lines of a page of at least text, determining whether a first line of the rolling pair is greater than a second line of the rolling pair in length;

upon determining that the first line of the rolling pair is greater than the second line of the rolling pair in length, determining whether a last word of the first line would fit as a first word of the second line;

upon determining that the last word of the first line would fit as the first word of the second line, determining whether moving the last word of the first line as the first word of the second line meets a predetermined criteria;

upon determining that moving the last word of the first line as the first word of the second line meets the predetermined criteria, moving the last word of the first line as the first word of the second line.

10. An electronic device comprising:

a memory to store a page of at least text;

a processor to execute a program to balance the at least text on the page without forcing any of the at least text onto a previous page or a next page, the program balances the page based in part on succeeding lines of text wherein the program is to balance the page on a rolling pair of lines-by-rolling pair of lines basis comprises, for each of a series of rolling pairs of lines of the page, determining whether a first line of the rolling pair is greater than a second line of the rolling pair in length;

upon determining that the first line of the rolling pair is greater than a second line of the rolling pair in length, determining whether a last word of the first line would fit as a first word of the second line;

upon determining that the last word of the first line would fit as a first word of the second line, determining whether moving the last word of the first line as the first word of the second line meets a predetermined criteria;

upon determining that moving the last word of the first line as the first word of the second line meets the predetermined criteria, moving the last word of the first line as the first word of second line; and outputting the page.

11. The device of claim 10, wherein the program is to balance the page on a rolling pair of lines-by-rolling pair of lines basis comprises moving a word from a first line of a rolling pair of lines to a second line of the rolling pair of lines based on a predetermined criteria.

* * * * *

UNITED STATES PATENT AND TRADEMARK OFFICE
CERTIFICATE OF CORRECTION

PATENT NO. : 6,966,026 B1  Page 1 of 1
APPLICATION NO. : 09/410644
DATED : November 15, 2005
INVENTOR(S) : Sommerer It is certified that error appears in the above-identified patent and that said Letters Patent is hereby corrected as shown below:

In column 1, line 25, after "computers" insert -- , --.

In column 1, line 28, after "Furthermore" insert -- , --.

In column 1, line 32, after "viewable" insert -- , --.

In column 1, line 33, delete "we" and insert -- are --, therefor.

In column 1, line 36, after "paginated" insert -- , --.

In column 1, line 46, after "example" insert -- , --.

Signed and Sealed this

First Day of September, 2009

David J. Kappos
*Director of the United States Patent and Trademark Office*